United States Patent [19]
Zlotnick

[11] Patent Number: 5,793,887
[45] Date of Patent: Aug. 11, 1998

[54] METHOD AND APPARATUS FOR ALIGNMENT OF IMAGES FOR TEMPLATE ELIMINATION

[75] Inventor: Aviad Zlotnick, D.N. Lower Galil, Israel

[73] Assignee: International Business Machines Corporation, Armonk, N.Y.

[21] Appl. No.: 481,309

[22] PCT Filed: Nov. 16, 1993

[86] PCT No.: PCT/EP93/03211

§ 371 Date: Jun. 30, 1995

§ 102(e) Date: Jun. 30, 1995

[87] PCT Pub. No.: WO95/14348

PCT Pub. Date: May 26, 1995

[51] Int. Cl.⁶ .............. G06K 9/62; G06K 9/00; G06K 9/32
[52] U.S. Cl. .............. 382/209; 382/151; 382/294
[58] Field of Search .............. 382/174, 294, 382/209, 217, 218, 216, 221, 151, 295, 306

[56] References Cited

U.S. PATENT DOCUMENTS 5,182,656  1/1993  Chevion et al. .............. 382/232
5,542,007  7/1996  Chevion et al. .............. 382/232

OTHER PUBLICATIONS

Wang, Ynjiun P. and Pavlidis, Theo, "Optimal Correspondence of String Subsequences", IEEE Transactions on Pattern Analysis and Machine Intelligence, vol. 12, No. 11, pp. 1080–1087, Nov. 1990.

*Primary Examiner*—Yon J. Couso
*Assistant Examiner*—Ha Tran Nguyen
*Attorney, Agent, or Firm*—Volel Emile

[57] ABSTRACT

The present application concerns an improved method and apparatus for fine alignment for template elimination. This method involves the steps of dividing a filled-in template image and a reference template image into vertical bands of a given number w of columns of picture elements, employing the OCS algorithm to correlate lines in the vertical bands of the filled-in form, herein referred to as vertical input bands, to lines in the corresponding bands of the reference template image, and constructing a new input image in which each line is moved into its new position—this new image being used as input image, e.g. for template elimination.

20 Claims, 3 Drawing Sheets

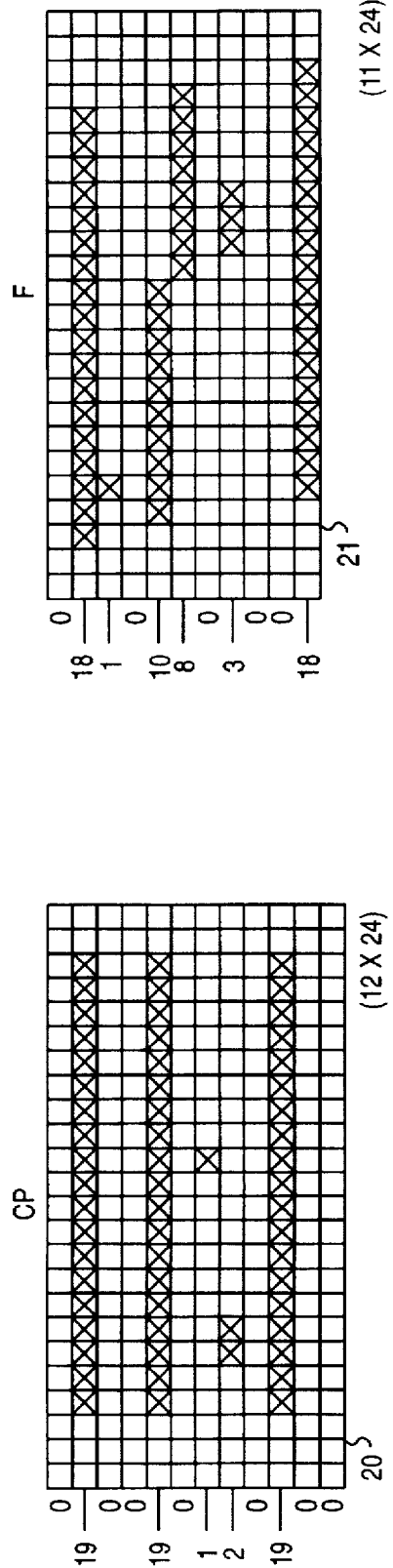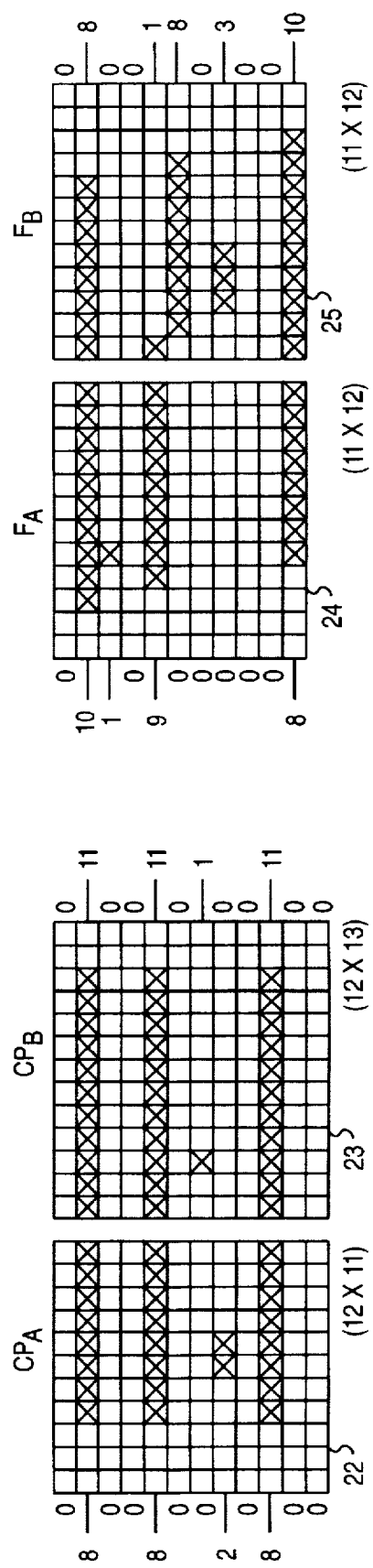
FIG. 2
FIG. 3

CP

METHOD AND APPARATUS FOR ALIGNMENT OF IMAGES FOR TEMPLATE ELIMINATION

TECHNICAL FIELD

The present invention relates to a method and apparatus for aligning images, in particular the image of an empty template and the image of a filled-in template, in order to be able to separate the information written into the template by eliminating the image of the empty template. The invention is of particular interest in areas where information filled into an invariant form is to be processed separately from the part of the image which does not contribute to the information content as such.

BACKGROUND OF THE INVENTION

The handling of paper documents is a daily routine in today's office environments. When trying to make the handling of documents—such as forms—more efficient, one has to digitise them in order to be able to employ modern data processing means such as computers or data transmission networks. Once a document is available to such a system, it is possible to load it in a storage from where it later can be retrieved. The storage and retrieval of documents is just one aspect in this connection, the other, possibly more important aspect is the treatment of the information contained in the documents.

The treatment of the information contained in documents generally involves the acquisition of the information by a reading device, the transformation of the acquired information into a machine-readable code, the storing of the coded information for later, and possibly repeated processing, the actual processing of the information and finally the output of the results of the processing.

The acquisition of the information by a reading device, such as an optical scanner, should be performed with sufficiently high resolution lest the information content should become mutilated or partially lost. Reading devices usually produce a high volume of scan data which in turn require powerful computers for fast and reliable processing and a large memory capacity for storage. As a typical example, a page of the A4 size (279×210 mm), scanned at 100 pels/cm (where "pel" stands for picture element and is either a white or black dot), requires about 700 kBytes of storage space. Even a rather modest number of documents would call for an unreasonable big memory.

Since most of an image of a filled-in form does not contribute to the information content, different methods have been developed for the separation of the standard or constant part (CP), which is the empty form, and the variable part (VP), which is the filled-in data. Such a separation of the constant part (CP) and the variable part (VP), also known as template elimination, has the following advantages:

Storage saving: it is possible to reconstruct many form images from their variable parts (VP) superimposed with a single copy of the constant part (CP). Typically, the varying part's (VP) size is just a fraction of the size of the whole image, and 90% saving in storage are possible.

Communication improvement: for the same reasons as above, separating the constant (CP) and variable parts (VP) saves up to a magnitude in communication volume and thus eliminates one of the common bottlenecks of forms processing systems.

Higher accuracy in optical character recognition (OCR): in certain situations the constant part (CP) of a form might interfere with automatic character recognition. Having access to the variable part (VP) alone, frequently eliminates this problem.

One method for the elimination of the constant part (CP), i.e. the form as such, has for example been implemented and reported by D. E. Nielsen et al., in "Evaluation of Scanner Spectral Response for Insurance Industry Documents", 16/A44 NCI Program, Working Paper No. 2, May 1973. This method, also known as "dropout ink" technique, is based on the idea to use a special colour ink when printing a form which is transparent to conventional scanners. If a completed form of this type is scanned, the basic pattern (i.e. CP) would be invisible to the scanner, and only the variable part (VP) would be entered into the computer. An evident disadvantage of this approach is that the use of special-ink-sensitive scanners would exclude the application of this approach to existing archives. Also, the use of special ink is certainly more cumbersome and costly. It is a further disadvantage of the "dropout ink" technique that there are customers who wish to eliminate the form background, but do not have any influence on how the forms they get are printed, and what kind of colour has been used for printing.

Another approach for the separation of the form background from the filled-in information is disclosed in European patent application EP-A-0 411 231 (U.S. Pat. No. 5,182,656) with title "Method for Compressing and Decompressing Forms by Means of very large Symbol Matching". According to this approach, samples of an empty form (CP) are pre-scanned and the data obtained digitised and stored in a computer memory to create a forms library. The original, filled-in form (F) to be compressed is then scanned, the data obtained digitised and the retrieved representation of the empty form (CP) is then subtracted, the difference being the digital representation of the variable part (VP), i.e. the filled-in information.

In order to perform such form elimination, it is necessary to precisely align the input form image (F) with an image of the empty template (CP). Even when the input form image is globally aligned with the template—i.e. there are no offset, skew, or scale differences—there usually are local distortions that must be straightened out before the template (i.e. the constant part CP) can be dropped out. Such local distortions are frequently the result of inconsistent scanner performance, or distortions from photocopying.

A method to compute fine registration, i.e. to align the constant part (CP) with respect to the variable part (VP) of an image is described in European patent applications EP-A-0 411 231 (U.S. Pat. No. 5,182,656), which has already been mentioned above, and in EP-A-0 411 232 (U.S. Pat. No. 5,204,756) with title "Method for High-Quality Compression of Binary Text Images". Assuming that the local distortions are small, and piecewise linear, both the input (F) and the template images (CP) are broken into small blocks and histogram correlation is used to find the relative offsets of corresponding blocks. A distinct consistency preserving process is employed to ensure there are no conflicts between the offsets computed for different blocks. In cases where there is not enough information in the histogram of a block, the offsets of the neighbouring blocks are used to compute its transformation.

In practice, the above technique usually works quite well, but improved reliability is required in some special cases:

Distortions accumulated through several iterations of copying a form come up against limiting factors of the existing technique.

With some scanners, using the same form both as template and as input does not result in a clean image after dropout.

Users have reported artifacts in form reconstruction in areas that are very densely filled, and which are therefore very sensitive to minute registration errors.

There are some reports of severe registration errors when the quality of the template scan is poor.

It has been found that the known techniques for template elimination are not adequate for dealing with images having non-linear distortions.

DISCLOSURE OF THE INVENTION

It is an object of the present invention to improve the handling of images with non-linear distortions in order to be able to make known template elimination techniques more reliable.

It is an object of the present invention to overcome the local distortions in order to be able to achieve a fine alignment of the input image (F) with the empty reference template image (CP).

It is a further object of the present invention to provide a method and apparatus for template elimination with improved robustness of the fine alignment process.

The above objects have been achieved in that an optimal correspondence subsequence (OCS) algorithm has been employed to improve the robustness of the fine alignment process. The method in accordance with this invention involves the steps of correlating lines in a reference template image to lines in a filled-in template image by finding corresponding pairs of projections in one direction of said lines in the reference template image and the filled-in template image, determining the displacement of the two projections of lines of each pair in a direction perpendicular to said direction of projection and evaluating the number of rows or columns the picture elements of each line of the filled-in template image has to be shifted to achieve a match between said pairs of projections, and generating a new input image (26) by shifting the picture elements of lines of the filled-in template image perpendicular to said direction of projection as determined in the last step.

In another advantageous embodiment of the present invention, the same steps are now repeated in a direction 90 degrees rotated with respect to the direction of projection of the above process.

In a further embodiment, the filled-in template image and the reference template image are divided into bands before carrying out the above process. This method has the advantage that it can easily cope with skewed lines.

BRIEF DESCRIPTION OF DRAWINGS

The invention is described in detail below with reference to the following drawings:

FIG. 2 shows images of a reference template and of an input template.

FIG. 3 shows the reference template image and the input template image of FIG. 2 divided into vertical bands, according to the present invention.

MODES FOR CARRYING OUT THE INVENTION

Figure 1:
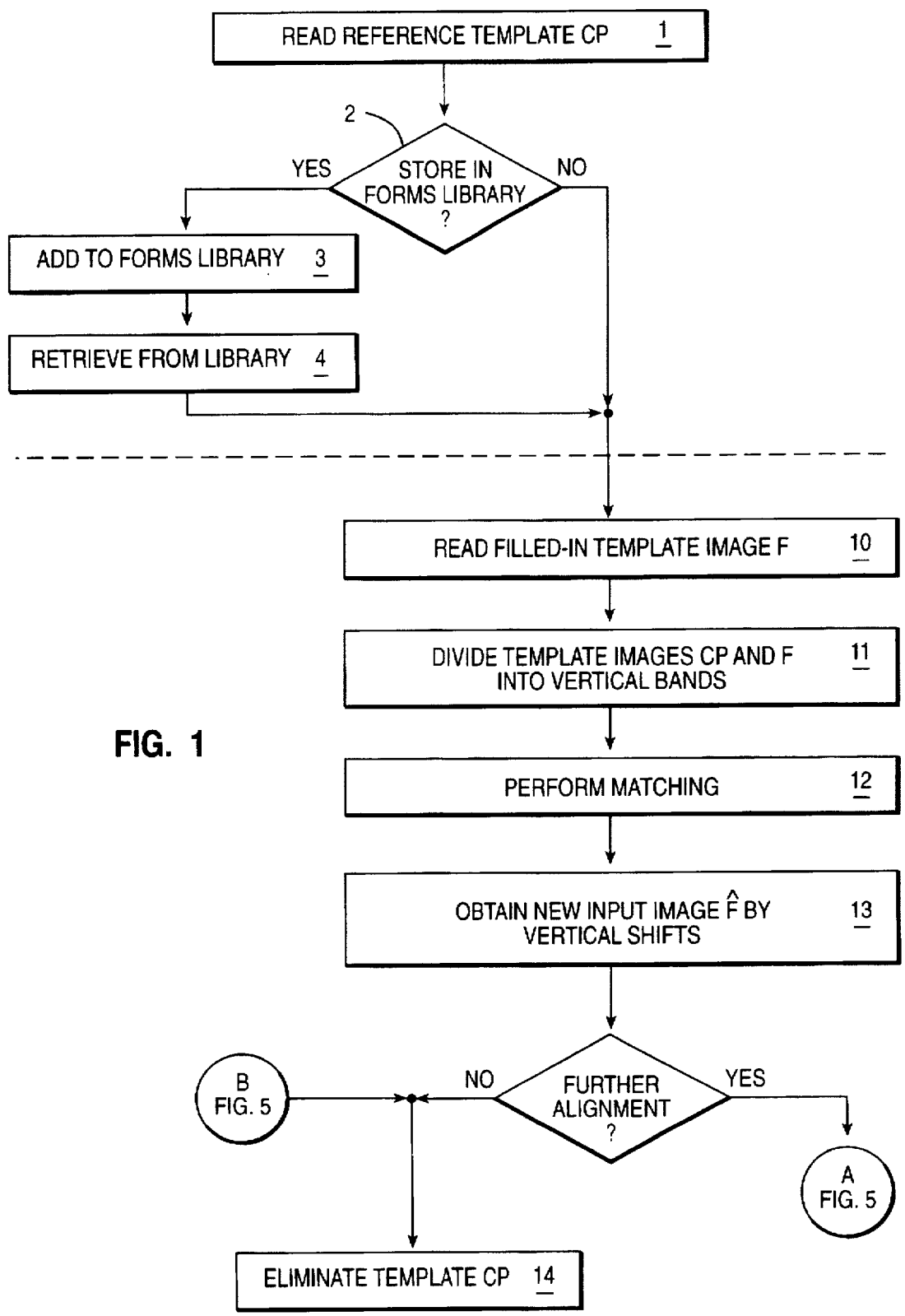
FIG. 1 is a flowchart illustrating the storage and retrieval of reference template images in a forms library and showing the horizontal fine alignment in accordance with the present invention.

Prior to eliminating the constant part (CP) of a filled-in template, known as template elimination technique, the image of an empty template, referred to as reference template image (CP), has to be precisely aligned with respect to the image of the filled-in template. Especially local distortions, in particular non-linear distortions, have a detrimental influence on the accuracy of this fine alignment. The better the alignment of the constant part (CP) with respect to the filled-in template (F) is, the better the result of the template elimination process will be. To improve the robustness of the whole fine alignment process, an algorithm known as optimal correspondence subsequence (OCS) algorithm has been adopted. This optimal correspondence subsequence algorithm has already been described in context with stereo matching, which is an infinite alphabet penalty minimisation problem. This problem of substring matching by means of the OCS algorithm has been described in the article "Optimal Correspondence of String Subsequences", Y. P. Wang et al., IEEE Transaction on Pattern Analysis and Machine Intelligence, Vol. 12, No. 11, November 1990, pp. 1080–1087.

In the following sections the use of the modified OCS algorithm—i.e the optimal subsequence correspondence for form recognition—in connection with fine alignment for template elimination is set out in detail. Note that the formulation of the below problem is somewhat different than standard, in that the function $f(i,j,a,b)$ takes the indices i and j as arguments in addition to the sequence elements a and b. This notation permits some flexibility in controlling unwanted matches.

Given are two sequences of picture elements (pels) $A=\{a_0, a_1, \ldots, a_N\}$, $B=\{b_0, b_1, \ldots, b_M\}$, and a function $f(i,j,a,b)$ such that $f(i,j,a,b) \geq 0$ for all numeric arguments. The function $f(i,j,a,b)$ is employed to evaluate the quality of the match between the elements a and b. The OCS is a set of index pairs P [2] such that the sum $$\sum_{i=0}^{i=L-1} f(j_i, k_i, a_{j_i}, b_{k_i}) \tag{1}$$

is maximum. Said set P [2] comprises the following index pairs $$P=\{(j_0, k_0),(j_1,k_1), \ldots, (k_L, k_L)\} \tag{2}$$

such that $$0 \leq j_0 < j_1 < \ldots < j_L \leq N$$

$$0 \leq k_0 < k_1 < \ldots < k_L \leq M,$$

L being the number of matched elements of the sequences of elements A and B. At the end of the above steps the maximal sum [1] and the sequence of index pairs P have been produced as output. The OCS algorithm as herein used is addressed in more detail below.

By the following steps 1)–4) a matrix S is calculated in which $s(N,M)$ is the score of the OCS problem with $A=\{a_0, a_1 \ldots a_N\}$, and $B=\{b_0, b_1, \ldots, b_M\}$.

1) $S(0,0)=f(a_0, b_0)$
2) for i=1 to N-1 $s(i,0)=MAX\{s(i-1,0), f(i,0, a_i, b_0)\}$
3) for j=1 to M-1 $s(0,j)=MAX\{s(0,j-1), f(0,j, a_0, b_j)\}$
4) for i=1 to N-1 for j=1 to M-1

$s(i,j)=MAX\{s(i,j-1), s(i-1,j), s(i-1,j-1)+f(i,j, a_i, b_j)\}$

In steps 5) through 9) the sequence of index pairs of set P are calculated as given by:

5) i=N-1, j=M-1
6) while i≧0 and l≧0
7) if i>0 and s(i-1,j)=s(i,j)i=i-1 else
8) if j>0 and s(i,j-1)=s(i,j) j=j-1 else
9) if s(i,j)>0 insert (i,j) at the beginning of P i=i-1 j=i-1.

s(N-1,M-1) is the return value of the modified OCS algorithm, and P has the required indices.

The mathematical background of the present invention has been set out in detail above. In the following sections, the method in accordance with the invention is described in connection with an example. The steps of the present method and some preparatory steps 1–4 are illustrated in the flowcharts given in FIGS. 1 and 5.

It is schematically illustrated in FIG. 1 that a reference template (CP) can either be scanned (box 1) and taken as reference input for the present fine alignment process, or be stored in a forms library. The storage in, and retrieval from such a library is indicated by steps 2,3, and 4.

As shown in FIG. 2, there is an image of an empty reference template 20 (CP) given, which consists of 12 rows of pels and 24 columns of pels. For the sake of simplicity, an underlying grid is shown in this and the subsequent figures and each black pel is shown as an X in said figures. It is to be noted that when referring to horizontal and vertical, either the direction parallel to the rows and parallel to the columns of an image are meant, or vice versa.

On the left hand side of the empty reference template 20 image (CP), the number of black pels per row is indicated. This sequence of numbers can be described by A={0, 19, 0, 0, 19, 0, 1, 2, 0, 19, 0, 0}. Template image 20 is usually stored in a storage (either a forms library or a work buffer) from where it can be easily retrieved (step 4). Steps 1–4 of scanning and storing the empty template 20 have not necessarily been carried out directly before carrying out all other steps illustrated in FIG. 1. The creation and maintenance of a database with adequate reference templates, i.e. a database comprising different empty forms (CP), is not addressed herein.

As first step of the present invention, the template to be processed (usually a filled-in form) is scanned by an appropriate scanner and an image 21 (F) of this template is obtained. The image 21 will hereinafter be referred to as input image. The respective step is shown in FIG. 1, box 10, and the digitised input image 21 itself is shown in FIG. 2. Since the content of this template, i.e. the information which is usually filled in, is not relevant when describing the fine alignment according to the present invention, an empty template similar to the one which was already used as reference template (CP) has been scanned. It is evident, when comparing the two images 20 and 21, that both images slightly differ due to inaccuracies introduced by the scanner. The second image 21 has only 11 rows and 24 columns of pels and some of the black pels are either missing or dislocated. The number of black pels per row of the input image is described by the sequence of pels B={0, 18, 1, 0, 10, 8, 0, 3, 0, 0, 18}. The number of pels per row of the reference image 20 in comparison to those of the input image 21 is illustrated in Table 1.

TABLE 1

| number of black pels of the reference and input template row | | | | | | | | | | | |
|---|---|---|---|---|---|---|---|---|---|---|---|
| A | 0 | 19 | 0 | 0 | 19 | 0 | 1 | 2 | 0 | 19 | 0 | 0 |
| B | 0 | 18 | 1 | 0 | 10 | 8 | 0 | 3 | 0 | 0 | 18 | |

Before elimination of the constant part (CP) of the input image 21, the local distortions have to be cleared and the input image 21 has to be precisely aligned with respect to the reference image 20.

According to the present invention, both the reference image 20 and the input image 21 are now divided into vertical bands, i.e. into bands comprising several columns of pels. This step is represented by box 11 in FIG. 1. As illustrated in FIG. 3, the reference image 20 is divided in two vertical reference bands 22 ($CP_A$) and 23 ($CP_B$). The input image 21 is divided into two vertical input bands 24 ($F_A$) and 25 ($F_B$). The number of black pels of each row of these four vertical bands is given in FIG. 3.

Next, the matching of each of the vertical input bands 24, 25 of the input image 21 and the reference bands 22, 23 of the reference image 20 is performed by employing the modified OCS algorithm. This step is indicated by reference number 12. In order to correlate the horizontal projection of lines in the vertical input bands 24, 25 to lines in the vertical reference bands 22 and 23, the OCS is employed. It determines the vertical offset of said lines in the vertical bands.

The sequences of black pels ($A_A, A_B$ and $B_A, B_B$ in the present example) are the horizontal projections of the lines in the vertical bands, and f(i,j,a,b) is the function that evaluates the quality of the match between the elements of these sequences of black pels. In Table 2, the matching of the vertical reference band 22 and the vertical input band 24 is illustrated. The "-" character denotes a missing entry. It implies deletion of the corresponding entry in Table 3.

TABLE 2

| matching of $CP_A$ and $F_A$ | | | | | | | | | | | | |
|---|---|---|---|---|---|---|---|---|---|---|---|---|
| $A_A$ | 0 | 8 | 0 | 0 | 8 | 0 | 0 | 2 | 0 | — | 8 | 0 | 0 |
| $B_A$ | 0 | 10 | 1 | 0 | 9 | 0 | 0 | 0 | 0 | 0 | 8 | | |

The number of matched elements is L=10. The matching of the sequences of pels $A_B$ and $B_B$ of the vertical bands $CP_B$ and $F_B$ is illustrated in Table 3. The number of matched elements is L=10, too.

TABLE 3

| matching of $CP_B$ and $F_B$ | | | | | | | | | | | | |
|---|---|---|---|---|---|---|---|---|---|---|---|---|
| $A_B$ | 0 | 11 | 0 | 0 | — | 11 | 0 | 1 | 0 | 0 | 11 | 0 | 0 |
| $B_B$ | 0 | 8 | 0 | 0 | 1 | 8 | 0 | 3 | 0 | 0 | 10 | | |

Figure 4:
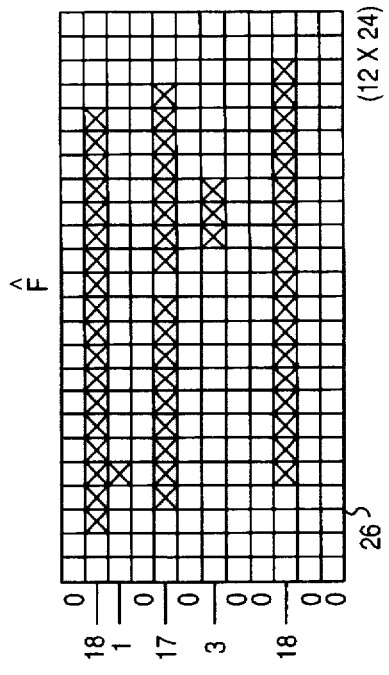
FIG. 4 shows the reference template of FIG. 2 and a new input image obtained according to the present invention.
Figure 4:
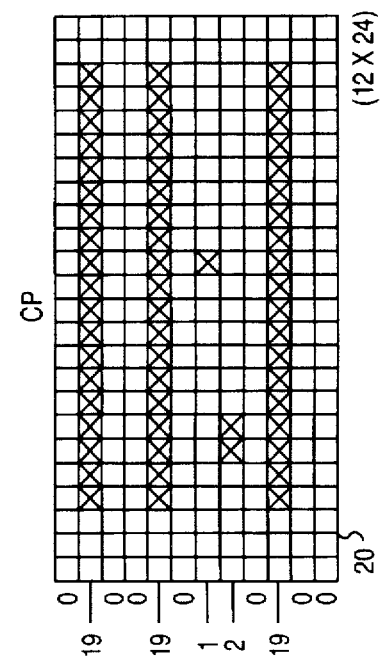

In accordance with the above OCS algorithm, new vertical positions for the lines in said vertical input bands $F_A$ and $F_B$ are defined. A new input image 26 ($\hat{F}$) in which each line is now moved into its new position is constructed next. This reconstruction by vertical shifts is shown as step 13 in FIG. 1. The new input image 26 ($\hat{F}$), FIG. 4, is used as input image for all further steps, i.e. either for the horizontal fine alignment steps of FIG. 5, or directly for template elimination (box 14, FIG. 1).

Figure 5:
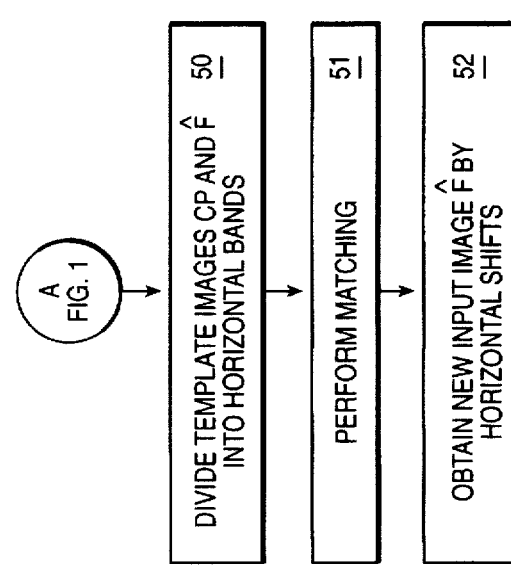
FIG. 5 is a flowchart showing the vertical fine alignment in accordance with the present invention.

The fine alignment in accordance with the present invention can now either be finished, said new input image 26 ($\hat{F}$) being taken as input image for a conventional template elimination process 14, or the steps 50–52, FIG. 5, might be carried out to further improve the alignment of reference template image 20 (CP) and new input image 26 (F̂).

Fine alignment in only one direction, e.g. either parallel to the rows of pels or parallel to the columns of pels, might lead to satisfying results in cases where for example a FAX machine is used for reading a filled-in form which causes mainly distortions along the vertical axis. These kind of distortions are sometimes caused by mechanical imperfections of the motor.

The horizontal fine alignment, see steps 50 through 52, is addressed in the following. Since the basic principle of the matching process has already been described above by way of example, steps 50–52 are not described in all details.

The new input image 26 (F̂) and the reference template image 20 (CP) are now divided into horizontal bands of a given 'heights' h (h=number of rows of pels). In the present example the total length of a template is only 24 pels and h=12 pels/band could for instance be chosen as 'heights' of the horizontal bands. The step of dividing said new input image 26 (F̂) and the reference image 20 (CP) into horizontal bands is depicted as step 50 in the flowchart of FIG. 5.

Next, the OCS algorithm is used to correlate lines in the horizontal input bands to lines in the horizontal reference bands and to determine the horizontal offset of vertical lines in said bands. $A_a$, $A_b$ and $B_a$, $B_b$ are now the vertical projections of the lines in the horizontal reference bands and the horizontal input bands, respectively. This step is illustrated by box 51 in FIG. 5. By means of a matching function f(i,j,a,b), the quality of the match between the sequences $A_a$ and $B_a$, as well as the match between $A_b$ and $B_b$ is evaluated, as described in context with the matching step 12.

Finally, a new input image (F̃) is constructed by moving the vertical lines in the horizontal input bands to their optimum position, see step 52 in FIG. 5.

The above algorithm can be speeded-up by the following optimisation measures:

1. Performing either the first matching process, i.e. the alignment of horizontal lines by means of vertical bands, or the second matching process, i.e. the alignment of vertical lines by means of horizontal bands.
2. Not evaluating the parts of S where i<j+max__diff or j<i+max__diff, where max__diff is application dependent.
3. Not evaluating the rest of row i if s(i,j) is big enough with respect to the maximal value in the row i−1, where big enough is application dependent.
4. Not evaluating the rest of column j if s(i,j) is big enough with respect to the maximal value in column j−1, where big enough is application dependent.

When processing documents consisting for instance of A4 pages, dividing each page into vertical bands of a 'width' w=250 pels and into horizontal bands of a 'height' h=250 pels has shown good results. It is to be noted that the matching function f(x,y) used in the present OCS algorithm can be modified. $f(x,y)=|w-(x-y)|$, $f(x,y)=|h-(x-y)|$ and $f(x,y)=1+MIN(x,y)$ are examples for the matching function to be used.

Figure 6:
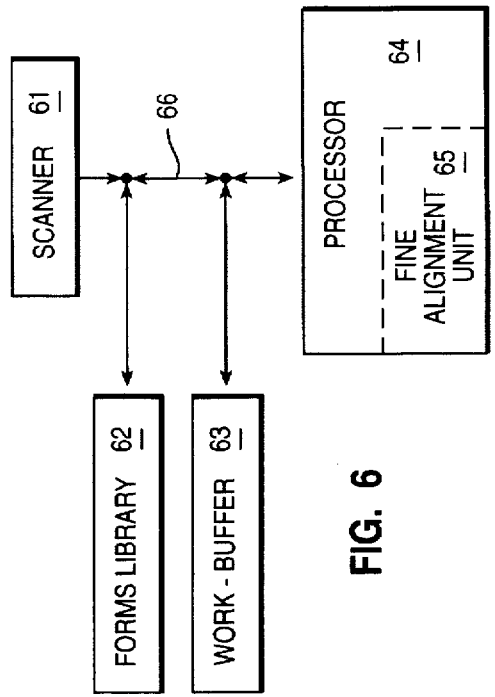
FIG. 6 is a schematic block diagram of an apparatus in accordance with the present invention.

An exemplary system for template elimination is schematically illustrated in FIG. 6. This system comprises a scanner 61, a forms library 62, a work buffer 63, and a fine alignment unit 65 being part of, or being controlled by, a processor 64. All these circuits and elements are interconnected by a bus 66, which might for example be an AT bus. According to the present invention, a reference template image, which might have been stored in said forms library 62, is fed to said fine alignment unit 65 on request of the processor 64. A filled-in template is scanned by scanner 61, and its image forwarded to the work buffer 63. From there it can be retrieved on request. The fine alignment unit 65 now carries out the steps in accordance with the present invention by interaction with the processor and the storages 62, 63. Finally, it stores the new input image (F̃) in said work buffer 63, from where it can be retrieved for template elimination.

It is evident, that instead of basing the present fine alignment process on black pels and sequences of black pels, white pels and the respective sequences of white pels might be used. It is furthermore to be noted that under certain circumstances no division of images is necessary, i.e. only one band of rows or columns is processed in accordance with the present invention. The rows of pels as herein used are either parallel to the shorter edge of a sheet of paper or perpendicular to this edge. The same applies to the columns of pels which are orthogonal to the rows.

The present technique is significantly more robust than conventional template elimination techniques. It was tested with many examples of the old techniques failures and proved superior with respect to the compression achieved, visual quality, and speed.

I claim:

1. A method of aligning a reference template image with a filled-in template image comprising the steps of:
   a) correlating lines in said reference template image to lines in said filled-in template image by finding corresponding pairs of projections in a first direction of said lines;
   b) determining a displacement of the two projections of lines of each of said corresponding pairs in a second direction perpendicular to said first direction and evaluating the number of picture elements each line of said filled-in template image has to be shifted to achieve a match between said pairs of projections, said step of determining including using $f(a,b)=1+MIN(a,b)$, where a represents picture elements in each of said lines in said reference template and b picture elements in each of said lines in said filled-in template, as a matching function to evaluate quality of said match; and
   c) generating a new input image by shifting the picture elements of lines of said filled-in template image perpendicular to said first direction using the determined displacement.

2. The method according to claim 1 wherein either $f(a,b)=|w-(a-b)|$ or $f(a,b)=|h-(a-b)|$ is used as said matching function, a representing picture elements in each of said lines in said reference template, b representing picture elements in each of said lines in said filled-in template, w and h being the width and height, respectively, of said reference and said filled-in templates.

3. The method according to claim 2, further comprising the steps of:
   a) correlating lines in said reference template image to lines in said new input image by finding corresponding pairs of projections of said lines in said reference template image and said new input image in said second direction;
   b) determining a displacement of the two projections of lines of each said pair in said first direction and evaluating the number of picture elements each line of said new input image has to be shifted to achieve a match between said pairs of projections; and
   c) generating a new input image by shifting the picture elements of lines of said filled-in template image in said first direction using the determined displacement.

4. The method according to claim 3, wherein said reference template image is divided into reference bands having a plurality of rows of picture elements, and said new input image is divided into corresponding input bands having a plurality of rows of picture elements, prior to carrying out steps a)–c) of claim 2, these steps being carried out separately for each reference band and its corresponding input band.

5. The method according to claim 4 wherein projections of lines in a direction parallel to said rows are determined by summing the number of black picture elements of each row of the respective image or band, and wherein projections of lines in a direction parallel to said columns are determined by summing the number of black picture elements of each column of the respective image or band.

6. The method according to claim 2, wherein said reference template image is divided into reference bands having a plurality of columns of picture elements, and said filled-in template image is divided into corresponding input bands having a plurality of columns of picture elements, prior to carrying out steps a)–c) of claim 1, these steps being carried out separately for each reference band and its corresponding input band.

7. The method according to claim 2 wherein said new input image and said reference template are taken as input for template elimination to separate the lines of said reference template from the contents of said filled-in template.

8. An apparatus for the alignment of a reference template image and a filled-in template image having a processor and a storage for storing said reference template image and said filled-in template image, said apparatus comprising:

means for correlating lines in said reference template image by finding corresponding pairs of projections in a first direction of said lines;

means for determining the displacement of the two projections of lines of each said corresponding pair in a second direction, said second direction being perpendicular to said first direction and means for evaluating the number of picture elements of each line said filled-in template image has to be shifted to achieve a match between pairs of projections, said determining means including means for using $f(a,b)=1+MIN(a,b)$, where a represents picture elements in each of said lines in said reference template and b picture elements in each of said lines in said filled-in template, as a matching function to evaluate quality of said match; and means for generating a new input image by shifting the picture elements of lines of said filled-in template image in said second direction as determined by said determining means.

9. The apparatus of claim 8 wherein $f(a,b)=|w-(a-b)|$ or $f(a,b)=|h-(a-b)|$, a representing picture elements in each of said lines in said reference template, b representing picture elements in each of said lines in said filled-in template, w and h being the width and height, respectively, of said reference and said filled-in templates, is used as said matching function.

10. The apparatus according to claim 9 further comprising:

means for correlating lines in said reference template image to lines in said new input image by finding corresponding pairs of projections of said lines in said reference template image and said new input image in said second direction;

means for determining the displacement of the two projections of lines of each said pair in said first direction and means for evaluating the number of lines the picture elements of said new input image has to be shifted to achieve a match between said pairs of projections; and means for generating a new input image by shifting the picture elements of said filled-in template image in said first direction as determined by said determining means.

11. The apparatus according to claim 10 further comprising means for dividing said reference template image into reference bands having a plurality of rows of picture elements, and for dividing said new input image into corresponding input bands having a plurality of rows of picture elements.

12. The apparatus according to claim 9 further comprising means for dividing said reference template image into reference bands having a plurality of columns of picture elements, and for dividing said filled-in template image into corresponding input bands having a plurality of columns of picture elements.

13. A method of aligning a filled-in template image with a reference template image, said filled-in and said reference template image each having a plurality of rows and columns of pixel elements, said method comprising the steps of:

matching each row of said filled-in template image to a corresponding row of said reference template image;

determining whether there exists an offset between each row of a pair of matched rows, said step of determining including the step of using $f(a,b)=1+MIN(a,b)$, where a represents picture elements in each of said lines in said reference template and b picture elements in each of said lines in said filled-in template, as a matching function to evaluate quality of said match; and adjusting said row of said filled-in template to eliminate said offset if said offset exists.

14. The method according to claim 13 wherein $f(a,b)=|w-(a-b)|$ or $f(a,b)=|h-(a-b)|$, a representing picture elements in each of said lines in said reference template, b representing picture elements in each of said lines in said filled-in template, w and h being the width and height, respectively, of said reference and said filled-in templates, is used as said matching function.

15. The method of claim 14 further comprising the steps of:

matching each column of said adjusted filled-in image to a corresponding column of said reference template image;

determining whether there exists an offset between each column of a pair of matched columns; and adjusting said column of said filled-in template to eliminate said offset if said offset exists.

16. The method of claim 15 further comprising the step of using one of two matching functions to evaluate quality of the column matches between the reference template image and the filled-in image:

$$f(a,b)=1+MIN(a,b),$$

or $$f(a,b)=|w-(a-b)|$$

and $$f(a,b)=|h-(a-b)|,$$

a representing picture elements in each of said lines in said reference template, b representing picture elements in each of said lines in said filled-in template, w and h being the width and height, respectively, of said reference and said filled-in templates.

17. An apparatus for aligning a filled-in template image with a reference template image, said filled-in and said reference template image each having a plurality of rows and columns of picture elements, said apparatus comprising:

means for matching each row of said filled-in template image to a corresponding row of said reference template image;

means for determining whether there exists an offset between each row of a pair of matched rows, said step of determining including the step of using $f(a,b)=1+\text{MIN}(a,b)$, where a represents picture elements in each of said lines in said reference template and b picture elements in each of said lines in said filled-in template, as a matching function to evaluate quality of said match; and means for adjusting said row of said filled-in template to eliminate said offset if said offset exists.

18. The apparatus of claim 17 wherein $f(a,b)=|w-(a-b)|$ or $f(a,b)=|h-(a-b)|$, a representing picture elements in each of said lines in said reference template, b representing picture elements in each of said lines in said filled-in template, w and h being the width and height, respectively, of said reference and said filled-in templates, is used as said matching function.

19. The apparatus of claim 18 further comprising:

means for matching each column of said adjusted filled-in image to a corresponding column of said reference template image;

means for determining whether there exists an offset between each column of a pair of matched columns; and means for adjusting said column of said filled-in template to eliminate said offset if said offset exists.

20. The apparatus of claim 17 further comprising means for using one of two matching functions to evaluate quality of column matches between the reference template image and the filled-in image:

$$f(a,b)=1+\text{MIN}(a,b),$$

or $$f(a,b)=|w-(a-b)|$$

and $$f(a,b)=|h-(a-b)|,$$

a representing picture elements in each of said lines in said reference template, b representing picture elements in each of said lines in said filled-in template, w and h being the width and height, respectively, of said reference and said filled-in templates.

* * * * *